(12) United States Patent
Kazi

(10) Patent No.: US 11,392,496 B2
(45) Date of Patent: Jul. 19, 2022

(54) MEMORY MANAGEMENT SYSTEM, MEMORY MANAGEMENT METHOD, AND INFORMATION PROCESSING APPARATUS WITH REDUCED POWER CONSUMPTION

(71) Applicant: SONY CORPORATION, Tokyo (JP)

(72) Inventor: Mamun Kazi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/971,151

(22) PCT Filed: Nov. 21, 2018

(86) PCT No.: PCT/JP2018/043086
§ 371 (c)(1),
(2) Date: Aug. 19, 2020

(87) PCT Pub. No.: WO2019/167360
PCT Pub. Date: Sep. 6, 2019

(65) Prior Publication Data
US 2021/0117323 A1   Apr. 22, 2021

(30) Foreign Application Priority Data

Feb. 28, 2018   (JP) .............................. JP2018-035904

(51) Int. Cl.
*G06F 12/0802*   (2016.01)
(52) U.S. Cl.
CPC ...... *G06F 12/0802* (2013.01); *G06F 2212/50* (2013.01); *G06F 2212/657* (2013.01)

(58) Field of Classification Search
CPC .. G06F 12/0802; G06F 12/0891; G06F 12/14; G06F 12/0895; G06F 12/1027;
(Continued)

(56) References Cited

U.S. PATENT DOCUMENTS

2003/0182571 A1* 9/2003 Hashimoto ......... G06F 12/1466
713/194
2007/0094475 A1   4/2007 Bridges et al.
(Continued)

FOREIGN PATENT DOCUMENTS

CN   101331466 A   12/2008
CN   102804153 A   11/2012
(Continued)

OTHER PUBLICATIONS

International Search Report and Written Opinion of PCT Application No. PCT/JP2018/043086, dated Feb. 26, 2019, 08 pages of ISRWO.

*Primary Examiner* — Michael Krofcheck
(74) *Attorney, Agent, or Firm* — Chip Law Group

(57) ABSTRACT

Provided is a memory management system that efficiently protects data in a cache memory adopting a virtual address cache method. The memory management system includes a cache memory that temporarily stores data for which memory access is requested by a processor core; a state storage unit that stores a security state communicated simultaneously with the memory access request from the processor core; and a memory management unit that manages access to a main memory. In a case where there is a change in the security state when memory access is requested by the processor core, a cache flush is performed for a cache line that hits the request.

12 Claims, 12 Drawing Sheets

(58) Field of Classification Search
CPC ............. G06F 12/1491; G06F 12/0893; G06F 2212/50; G06F 2212/657
See application file for complete search history.

(56) References Cited

U.S. PATENT DOCUMENTS

| | | | |
|---|---|---|---|
| 2008/0072004 A1* | 3/2008 | Kershaw | G06F 12/0815 711/163 |
| 2008/0133842 A1* | 6/2008 | Raikin | G06F 12/1491 711/145 |
| 2011/0202740 A1 | 8/2011 | Grisenthwaite | |
| 2015/0032964 A1* | 1/2015 | Habermann | G06F 12/0848 711/122 |
| 2019/0102324 A1* | 4/2019 | Ozsoy | G06F 12/0831 |

FOREIGN PATENT DOCUMENTS

| | | |
|---|---|---|
| JP | 08-110873 A | 4/1996 |
| JP | 2006-155516 A | 6/2006 |
| JP | 2012-212440 A | 11/2012 |
| JP | 2013-522702 A | 6/2013 |
| JP | 2014-078248 A | 5/2014 |
| KR | 10-2008-0063514 A | 7/2008 |
| KR | 10-2013-0001240 A | 1/2013 |

\* cited by examiner

MEMORY MANAGEMENT SYSTEM, MEMORY MANAGEMENT METHOD, AND INFORMATION PROCESSING APPARATUS WITH REDUCED POWER CONSUMPTION

CROSS REFERENCE TO RELATED APPLICATIONS

This application is a U.S. National Phase of International Patent Application No. PCT/JP2018/043086 filed on Nov. 21, 2018, which claims priority benefit of Japanese Patent Application No. JP 2018-035904 filed in the Japan Patent Office on Feb. 28, 2018. Each of the above-referenced applications is hereby incorporated herein by reference in its entirety.

TECHNICAL FIELD

The technology disclosed in the present specification relates to a memory management system adopting a virtual address cache method, a memory management method, and an information processing apparatus.

BACKGROUND ART

A memory management unit (MMU) is disposed between a processor and a physical memory in a general memory system. The MMU performs such address conversion for an entire virtual address space to achieve a virtual address space for each process and also provide a virtual memory equal to or larger than real memory capacity.

Furthermore, memories are hierarchized so as to solve the insufficiency of memory speed in the processor. Specifically, as a primary cache, a high-speed and small-capacity memory is built into the same chip as the processor. Then, a static random access memory (SRAM), which is expensive and high in speed, is disposed as a secondary cache in the vicinity of the processor. In addition, there is disposed a main memory including a dynamic RAM (DRAM) which is relatively low in speed and inexpensive.

Here, as methods in which a processor refers to a cache memory, there can be cited a physical address cache method for a search with a converted physical address and a virtual address cache method for a search with a virtual address. In a memory system adopting the physical address cache method, an MMU is disposed between a processor and a cache memory, and address conversion is performed each time the processor accesses the cache. Meanwhile, in a memory system adopting the virtual address cache method, an MMU is disposed between a cache memory and a main memory, and a processor refers to the cache memory by using a virtual address. Only in the case of a cache miss, the MMU performs address conversion, and the main memory is accessed.

The physical address cache method is mainly used in a memory system having a cache memory. However, the physical address cache method has a problem in that address conversion processing is performed in an MMU each time a processor accesses a cache memory, leading to a reduction in power efficiency and circuit speed.

Meanwhile, in the virtual address cache method, address conversion and the activation of a cache memory are performed in an MMU only in the case of a cache miss. Thus, power consumption is reduced. Therefore, the virtual address cache method is considered promising for the ultra-low power consumption Internet of things (IoT) that needs to be operated for many hours with a battery and wearable devices that require low power consumption.

CITATION LIST

Patent Document

Patent Document 1: Japanese Patent Application Laid-Open No. 2014-78248
Patent Document 2: Japanese Patent Application Laid-Open No. 2006-155516

SUMMARY OF THE INVENTION

Problems to be Solved by the Invention

An object of the technology disclosed in the present specification is to provide a memory management system that efficiently protects data in a cache memory adopting the virtual address cache method, a memory management method, and an information processing apparatus.

Solutions to Problems

A first aspect of the technology disclosed in the present specification is a memory management system including:
a cache memory that temporarily stores data for which memory access is requested by a processor core;
a state storage unit that stores a security state communicated simultaneously with the memory access request from the processor core; and a memory management unit that manages access to a main memory. The cache memory adopts a virtual address cache method.

Note that the term "system" as used herein refers to a logical set of a plurality of devices (or functional modules that implement specific functions), and it does not matter whether or not each device or functional module is in a single housing.

The state storage unit includes any of a tag memory in the cache memory, a register disposed separately from the tag memory in the cache memory, or a memory or a register mounted outside a cache line body, and stores a security state for each line of the cache memory.

The memory management system according to the first aspect is configured such that in a case where the security state in which memory access is requested by the processor core does not match a security state stored in the state storage unit, a cache flush is performed for a cache line that hits the request.

Alternatively, the memory management system according to the first aspect is configured such that in a case where the security state in which memory access is requested by the processor core does not match a security state stored in the state storage unit, a protection check is performed by the memory management unit, and in a case where the memory access request is permitted, a cache line that hits the request is accessed and the security state stored in the state storage unit is updated.

Alternatively, the memory management system according to the first aspect is configured such that in a case where although the security state in which memory access is requested by the processor core does not match a security state stored in the state storage unit, a difference between the security states satisfies a predetermined rule within the cache memory, a cache line that hits the request is accessed and the security state stored in the state storage unit is updated.

Furthermore, a second aspect of the technology disclosed in the present specification is a memory management method including:

a step of reading, from a main memory, data for which memory access is requested by a processor core and temporarily storing the data in a cache memory;

a state storage step of storing a security state communicated simultaneously with the memory access request from the processor core; and a control step of controlling access to the cache memory and the main memory on the basis of a result of comparing the security state in which memory access is requested by the processor core with a security state stored in the state storage unit.

Moreover, a third aspect of the technology disclosed in the present specification is an information processing apparatus including:

a processor core;

a main memory;

a cache memory that temporarily stores data for which memory access is requested by the processor core;

a state storage unit that stores a security state communicated simultaneously with the memory access request from the processor core; and a memory management unit that manages access to the main memory.

Effects of the Invention

According to the technology disclosed in the present specification, it is possible to provide a memory management system, a memory management method, and an information processing apparatus. The memory management system can protect data in a cache memory adopting a virtual address cache method with a small amount of information stored in the cache memory.

Note that the effects described in the present specification are merely examples, and the effects of the present invention are not limited thereto. In addition, the present invention may exhibit additional effects other than the effects described above.

Still other objects, features, and advantages of the technology disclosed in the present specification will be apparent from an embodiment to be described later and more detailed descriptions based on the accompanying drawings.

MODE FOR CARRYING OUT THE INVENTION

Figure 1:
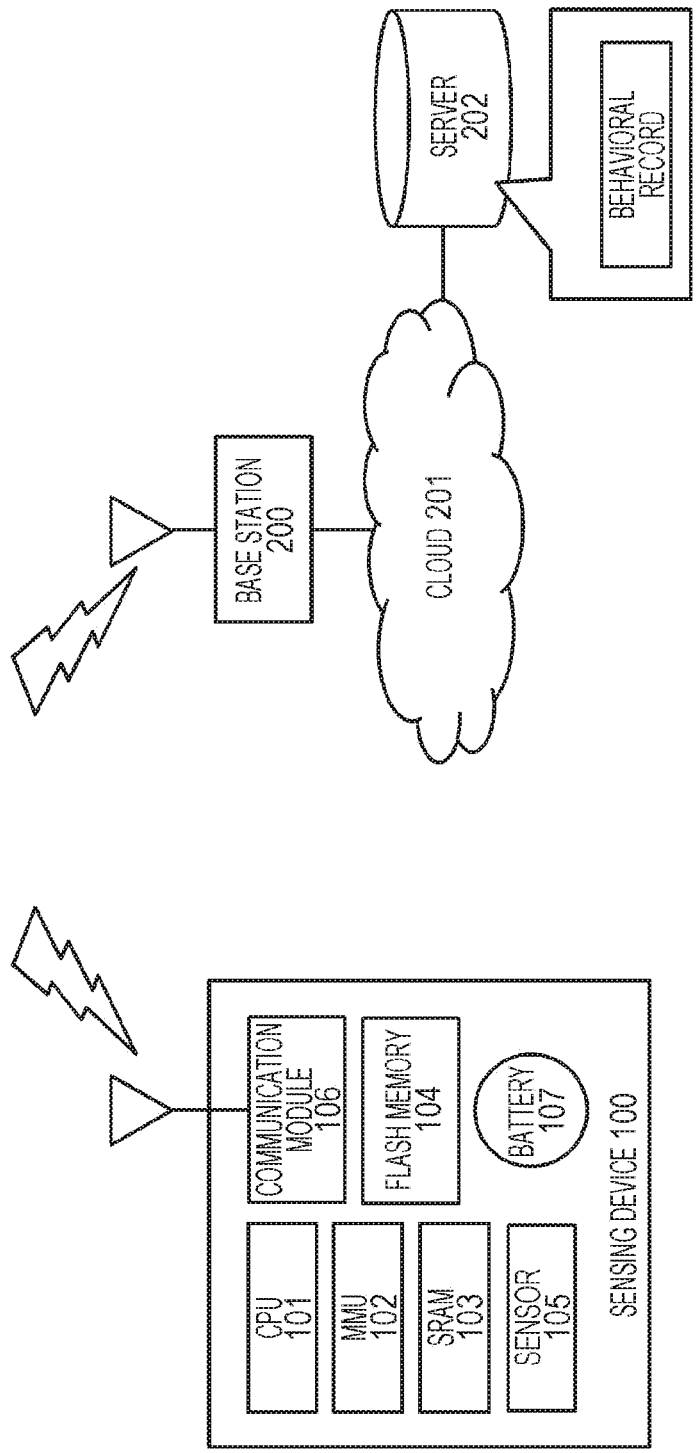
FIG. 1 is a diagram schematically showing a configuration example of a system including an embedded device.

Hereinafter, an embodiment of the technology disclosed in the present specification will be described in detail with reference to the drawings.

There are cases where permission information is set in each piece of data to be handled by a processor. The permission information includes, for example, a security state or a protection attribute such as a user permitted to have access or a permitted process (reading, writing, execution, or the like). In such cases, it is necessary to perform a permission check to protect a memory each time the processor accesses the memory.

For example, an MMU includes a translation lookaside buffer (TLB) that stores information for converting virtual addresses into physical addresses in page units, and can hold, as a page attribute, the permission information on a corresponding page for each entry in the TLB. Therefore, in a physical address cache method, a permission check can be easily performed each time a processor core accesses a cache memory.

Meanwhile, in a virtual address cache method, an MMU is disposed at the subsequent stage of a cache memory (described above). For this reason, when a processor core accesses the cache memory, a permission check cannot be performed by the MMU. Therefore, it is necessary to protect the memory by another method (that is, a method that does not depend on the MMU).

For example, a processing system has been proposed which stores a page attribute of line data for each cache line when data are cached in a cache memory via an MMU as a result of a cache miss (see, for example, Patent Document 1). According to this processing system, a permission check can be performed at the time of a cache hit on the basis of information in the cache memory, so that memory protection can be easily achieved in the virtual address cache method.

However, in this processing system, a capacity for holding a copy of the permission information for each line in the cache memory needs to be separately provided in the cache memory. Generally, the line size of a cache is smaller than the size of a page which is a unit of address conversion. Therefore, copied permission information has redundancy. For example, assume that a cache line is 16 bytes, a page size is 16 kbytes, and the total capacity of the cache memory is 16 kbytes. In the case of such a memory configuration, even if all data in the cache memory are data corresponding to the same page, 1,024 copies of the same permission information need to be held in the cache memory, leading to redundancy.

Furthermore, it is considered that this processing system requires a sideband signal and a control circuit for transmitting permission information from the MMU to the cache memory. Generally, there is only unidirectional communication from the cache memory to the MMU. Therefore, providing such a sideband circuit and a control circuit increases a circuit cost for information communication from the MMU to the cache memory.

In addition, there has been proposed a memory management system configured such that when an access right is changed, the contents of a cache memory are flushed, so that a cache miss occurs at the next access and data are necessarily obtained from a physical memory (see, for example, Patent Document 2). According to this memory management system, a permission check can be properly performed via an MMU after an access right is changed, so that data can be obtained from a main memory. However, in this memory management system, it is necessary to flush entire data in the cache memory once with an external signal to synchronize the data in the cache memory with data in the main memory.

Accordingly, proposed below in the present specification is a memory management system that can achieve protection of data in a cache memory adopting the virtual address cache method, with a small amount of information stored in the cache memory.

FIG. 1 schematically shows a configuration example of a system including an embedded device to which a memory management system disclosed in the present specification can be applied. The shown system includes a sensing device 100, a base station 200, and a server 202. The sensing device 100 corresponds to an embedded device. The server 202 is installed on a cloud 201.

The sensing device 100 can wirelessly connect to the base station 200 and access the server 202 via the cloud 201.

The sensing device 100 includes a central processing unit (CPU) 101, an MMU 102, memories such as a static random access memory (RAM) (SRAM) 103 and a flash memory 104, a sensor 105, and a communication module 106. The sensing device 100 is a device to be driven by a battery 107. Note that a cache memory (L1 cache or L2 cache) adopting the virtual address cache method is disposed between the CPU 101 and the MMU 102, but is omitted in FIG. 1 for simplification of the drawing. Note that the battery 107 may be a rechargeable lithium-ion battery or a non-rechargeable battery.

The sensing device 100 is used by being worn by a wearer, for example. The CPU 101 analyzes the behavior of the wearer (stopped, walking, running, or the like) on the basis of a detection signal of the sensor 105. Then, an analysis result is wirelessly transmitted from the communication module 106 to the base station 200, and is recorded on the server 202 via the cloud 201. The server 202 uses the data received from the sensing device 100 for watching the wearer, or the like.

Figure 2:
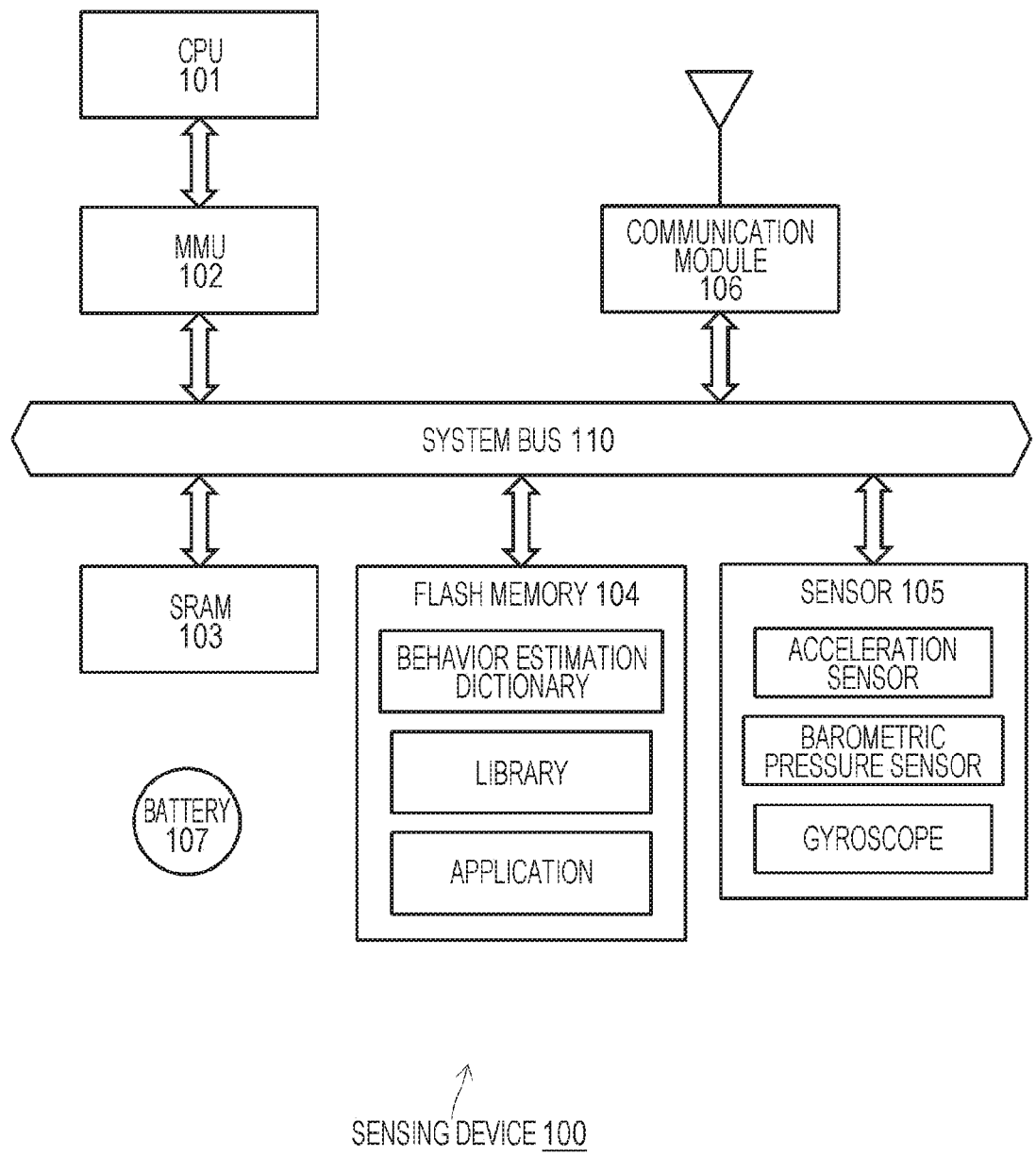
FIG. 2 is a diagram showing an example of a hardware configuration of a sensing device 100.

FIG. 2 shows a hardware configuration example of the sensing device 100 as an example of an embedded device.

The CPU 101 is connected to a system bus 110 via the MMU 102. Furthermore, devices such as the SRAM 103, the flash memory 104, the sensor 105, and the communication module 106 are connected to the system bus 110.

The flash memory 104 stores an application for estimating the behavior of the wearer on the basis of, for example, the signal of the sensor 105, a library to be used when the application is executed, and data such as a behavior estimation dictionary for estimating the behavior of the wearer.

Furthermore, the sensor 105 includes one or more sensor devices such as an acceleration sensor, a barometric pressure sensor, a gyroscope, a global positioning system (GPS), a time of flight (TOF) image distance sensor, and a light detection and ranging (LIDAR) sensor.

These devices connected to the system bus 110 are disposed in a physical address space for which address conversion is performed by the MMU 102. The SRAM 103 is disposed in this physical address space. In addition, the flash memory 104 is disposed in the physical address space such that the contents of the flash memory 104 are directly visible from the CPU 101 or the MMU 102. Furthermore, the communication module 106 and I/O ports of various sensor devices included in the sensor 105 are disposed in the physical address space.

The sensing device 100 needs to be operated for many hours with the battery 107. Thus, a reduction in power consumption is necessary. Therefore, in order to improve power efficiency, the virtual address cache method is applied in which address conversion is performed in the MMU only in the case of a cache miss.

Figure 3:
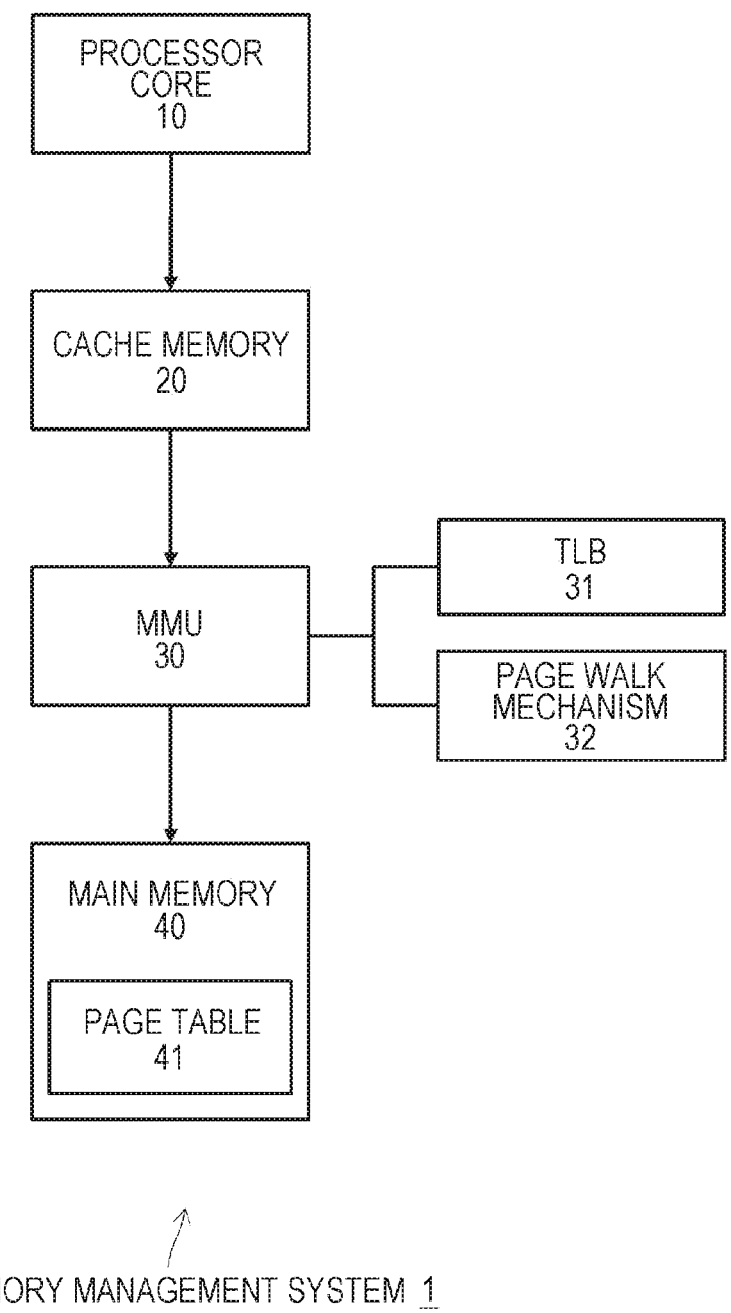
FIG. 3 is a diagram schematically showing a configuration example of a memory management system 1 adopting a virtual address cache method.

FIG. 3 schematically shows a configuration example of a memory management system 1 adopting the virtual address cache method, the system being applied to the sensing device 100. The shown memory management system 1 includes a processor core 10, a cache memory 20, a memory management unit (MMU) 30, and a main memory 40 as a physical memory. First, memory access operation in the memory management system 1 will be briefly described.

The cache memory 20 adopts the virtual address cache method, so that the processor 10 accesses the cache memory 20 by using a virtual address. Note that the cache memory 20 may be either an L1 cache or an L2 cache.

In a case where a cache hit occurs for a virtual address requested by the processor core 10, the cache memory 20 performs a read or write operation on a corresponding cache line. Furthermore, in a case where a cache miss occurs for a virtual address requested by the processor core 10, the cache memory 20 issues a memory request to the MMU 30 by using the virtual address. Note that details of the flow of memory access control relating to the cache memory 20 and the MMU 30 will be described later.

The MMU 30 includes a translation lookaside buffer (TLB) 31 and a page walk mechanism 32. The TLB 31 is used to hold information for converting virtual addresses into physical addresses in page units. Furthermore, the page walk mechanism 32 has the function of referring to a page table 41 located in the main memory. The page table 41 contains the correspondence relationship between virtual addresses and physical addresses described in page units.

In a case where an entry corresponding to a virtual address requested by the processor core 10 (however, in the case of a cache miss) is found in the TLB 31 (that is, in a case where a TLB hit occurs), the MMU 30 uses information of the entry to convert the virtual address into a physical address, and accesses the main memory 40 by using the converted physical address.

Meanwhile, in a case where no entry corresponding to the virtual address requested by the processor core 10 is found in the TLB 31 (that is, in a case where a TLB miss occurs), the page walk mechanism 32 searches the page table 41, and finds information on a physical address of a page corresponding to the requested virtual address, so that the page walk mechanism 32 creates a new entry in the TLB 31 for mapping the virtual address, access to which has been requested, and the physical address. Thereafter, the MMU 30 can perform the address conversion process again to convert the requested virtual address into a physical address.

Next, data protection in the memory management system 1 adopting the virtual address cache method will be considered.

In the cache memory adopting the physical address cache method, permission information on a corresponding page is held as a page attribute for each entry in the TLB. This enables the MMU to perform a permission check when the processor core accesses the cache memory, so that address conversion is performed only in a case where access is permitted. As a result, it is possible to protect data at the time of address conversion. Meanwhile, in the virtual address cache method, the processor core can directly access the cache memory without involving the MMU. Therefore, when the processor core accesses the cache memory, the permission check cannot be performed by the MMU. Therefore, it is necessary to protect the memory by a method that does not depend on the MMU (described above).

For example, the following method can be cited as such a method. When a cache miss occurs and data are cached in the cache memory 20 via the MMU 30, permission information stored as a page attribute in a corresponding TLB entry in the TLB 31 is copied to each line in the cache memory 20 as shown in FIG. 12.

Figure 12:
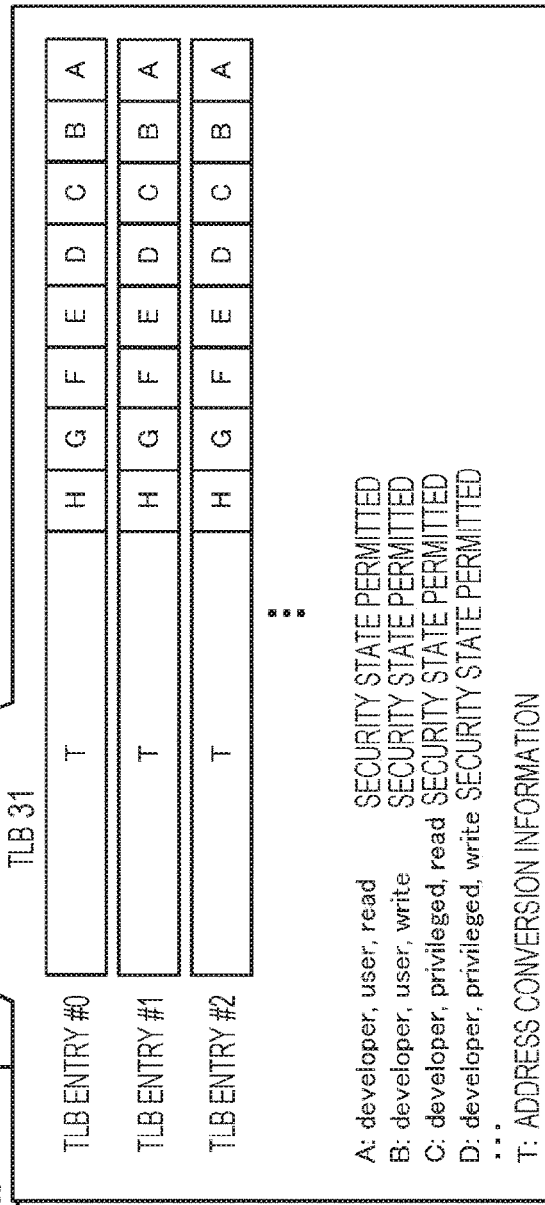
FIG. 12 is a diagram showing how permission information is copied from an MMU 30 to the cache memory 20.

In FIG. 12, when the processor core 10 requests memory access, the security state of a process is transmitted to the cache memory 20 simultaneously with a requested virtual address. In the shown example, eight combinations of a plurality of security-related parameters are represented as 3-bit information. Examples of the parameters include the type of the process (whether the process is a process of "developer" or "proprietary"), the mode of the process (whether the process is performed in the "user" mode or the "privileged" mode), and a permitted process ("read", "write", or the like).

Meanwhile, the MMU 30 holds permission information on the corresponding page for each entry in the TLB 31. Specifically, the permission information indicates a memory access authority (that is, whether to permit access or protect the memory) for each of the eight security states described above with 1 bit, that is, 8 bits in total by use of eight flags A to H. In each entry in the TLB 31, permission information corresponding to a security state of a corresponding physical page is held in the form of the eight flags A to H indicating whether or not to permit memory access, together with information (T) for converting a corresponding virtual address into a physical address. For example, the flag A indicates, with 1 or 0, whether or not to permit memory access to the corresponding page for a security state (developer, user, read). Similarly, the flag B indicates whether or not to permit memory access to the corresponding page for a security state (developer, user, write), and the flag C indicates whether or not to permit memory access to the corresponding page for a security state (developer, privileged, read). Then, in the example shown in FIG. 12, 8-bit permission information (flags A to H) regarding data in the corresponding page is copied to the cache memory 20 for each cache line.

When the processor core 10 performing a process requests memory access, the cache memory 20 can determine whether to permit the memory access or protect the memory with reference to a flag corresponding to a security state communicated from the processor core 10 simultaneously with the memory access request, among the 8-bit permission information copied from the MMU 30. For example, when a process being performed in the security state "A" requests memory access, the MMU 30 can determine whether or not to permit the access with reference to the flag "A" in permission information held in a TLB entry corresponding to a requested virtual address.

In the example shown in FIG. 12, each entry in the TLB 31 of the MMU 30 holds, as a page attribute, the 8-bit permission information (flags A to H) regarding the data in the corresponding page together with the information (T) for converting a virtual address into a physical address in page units. For example, assume that a cache line is 16 bytes, a page size is 16 kbytes, and the total capacity of the cache memory 20 is 16 kbytes. In the case of such a memory configuration, even if all the data in the cache memory 20 are data corresponding to the same page, the cache memory 20 needs to have a memory capacity of 1,024×8 bits for copying the same permission information, leading to redundancy.

In short, the method for protecting the memory by copying the permission information in the MMU 30 to the cache memory 20, as shown in FIG. 12, has a problem in that a capacity for holding a copy of the permission information for each line in the cache memory 20 needs to be separately provided in the cache memory 20. Furthermore, the line size of the cache memory 20 is generally smaller than the size of a page which is a unit of address conversion. Therefore, copied information has redundancy. Moreover, it is necessary to provide a (reverse) sideband signal and a control circuit for transmitting permission information from the MMU 30 to the cache memory 20.

Therefore, the present embodiment achieves data protection in the cache memory adopting the virtual address cache method by storing, in the cache memory 20, a security state communicated simultaneously with a memory access request from the processor core 10 in units of cache lines, instead of using the method in which the permission information defined in page units is copied to the cache memory 20 (see FIG. 12).

Figure 4:
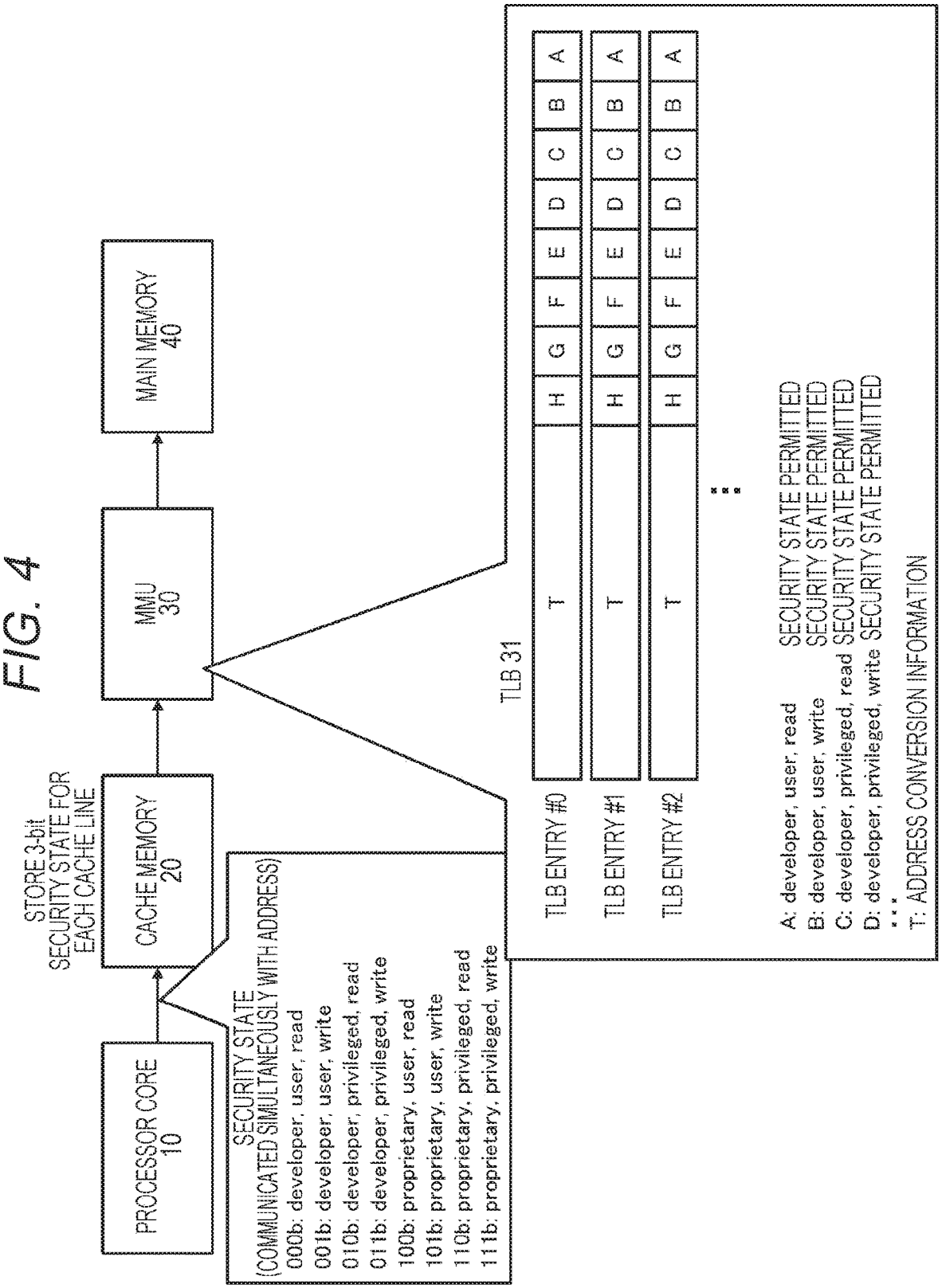
FIG. 4 is a diagram showing how a security state communicated simultaneously with a memory access request from a processor core 10 is stored in a cache memory 20.

FIG. 4 shows how a security state communicated simultaneously with a memory access request from the processor core 10 is stored in the cache memory 20 in cache line units.

When the processor core 10 requests memory access, the security state of the process is transmitted to the cache memory 20 simultaneously with a requested virtual address. In the shown example, eight combinations of a plurality of security-related parameters are represented as 3-bit information. Examples of the parameters include the type of the process (whether the process is a process of "developer" or "proprietary"), the mode of the process (whether the process is performed in the "user" mode or the "privileged" mode), and a permitted process ("read", "write", or the like). The cache memory 20 stores the 3-bit information regarding the security state in association with a cache line, access to which has been requested. Note that the processor core 10 and the cache memory 20 are connected by a 3-bit sideband signal for communicating a security state, in addition to an address bus for issuing a memory access request.

Meanwhile, the MMU 30 holds permission information on the corresponding page for each entry in the TLB 31. In the example shown in FIG. 4, the permission information indicates a memory access authority (that is, whether to permit access or protect the memory) for each of the eight security states described above with 1 bit, that is, 8 bits in total by use of eight flags A to H. In each entry in the TLB 31, permission information corresponding to a security state of a corresponding physical page is held in the form of the eight flags A to H indicating whether or not to permit memory access, together with information (T) for converting a corresponding virtual address into a physical address.

For example, the flag A indicates, with 1 or 0, whether or not to permit memory access to the corresponding page for a security state (developer, user, read). Similarly, the flag B indicates whether or not to permit memory access to the corresponding page for a security state (developer, user, write), and the flag C indicates whether or not to permit memory access to the corresponding page for a security state (developer, privileged, read).

When the processor core 10 performing a process requests memory access, the processor core 10 first accesses the cache memory 20. In a case where data referred to on the basis of a requested virtual address are cached in a cache line (cache hit), a security state stored in association with the cache line on which the cache hit has occurred is compared with a security state of the process communicated from the processor core 10 simultaneously with the memory access request. Thus, the processor core 10 can directly access data of the memory cached in the cache memory 20 without involving the MMU 30. Only in a case where a cache miss occurs, there is used a permission reference function in the TLB 31 via the MMU 30.

While the permission information for each page is represented by 8 bits (described above), the security state is represented by 3 bits. Therefore, it can be understood that holding the security state for each cache line instead of the permission information significantly reduces memory capacity. In addition, the security state is transmitted to the cache memory 20 together with a normal memory access request from the processor core 10. Therefore, a reverse sideband signal and a control circuit for holding the security state in the cache memory 20 are not necessary.

In the example described above, the permission information for each security state is represented by 1 bit. For example, "1" indicates that the security state is permitted, and "0" indicates that the security state is rejected. As a modified example, the permission information for each security state may be represented by 2 bits or more. As a result of allocating more bits, detailed system operation can be defined according to the level of unauthorized access. For example, as a result of using 2 bits for permission information regarding to the security state "A", it is possible to define detailed system operation as shown in Table 1 below.

TABLE 1

| VALUE OF A | SYSTEM OPERATION |
| --- | --- |
| A = 3 | developer, user, read SECURITY STATE PERMITTED |
| A = 2 | developer, user, read SECURITY STATE REJECTED + NOTIFICATION DUE TO BUS ERROR IS NOT GENERATED |
| A = 1 | developer, user, read SECURITY STATE REJECTED + NOTIFICATION DUE TO BUS ERROR IS GENERATED |
| A = 0 | developer, user, read SECURITY STATE REJECTED + NOTIFICATION DUE TO BUS ERROR IS GENERATED + ALERT DUE TO INTERRUPTION IS GENERATED |

Note that as methods for storing a security state for each cache line in the cache memory 20, there can be cited, for example, a method in which a tag area associated with each cache line is expanded, a method in which a register or memory is mounted separately from a tag, and a method in which a register or a memory that holds the security state for each cache line is mounted outside the cache memory 20.

Figure 5:
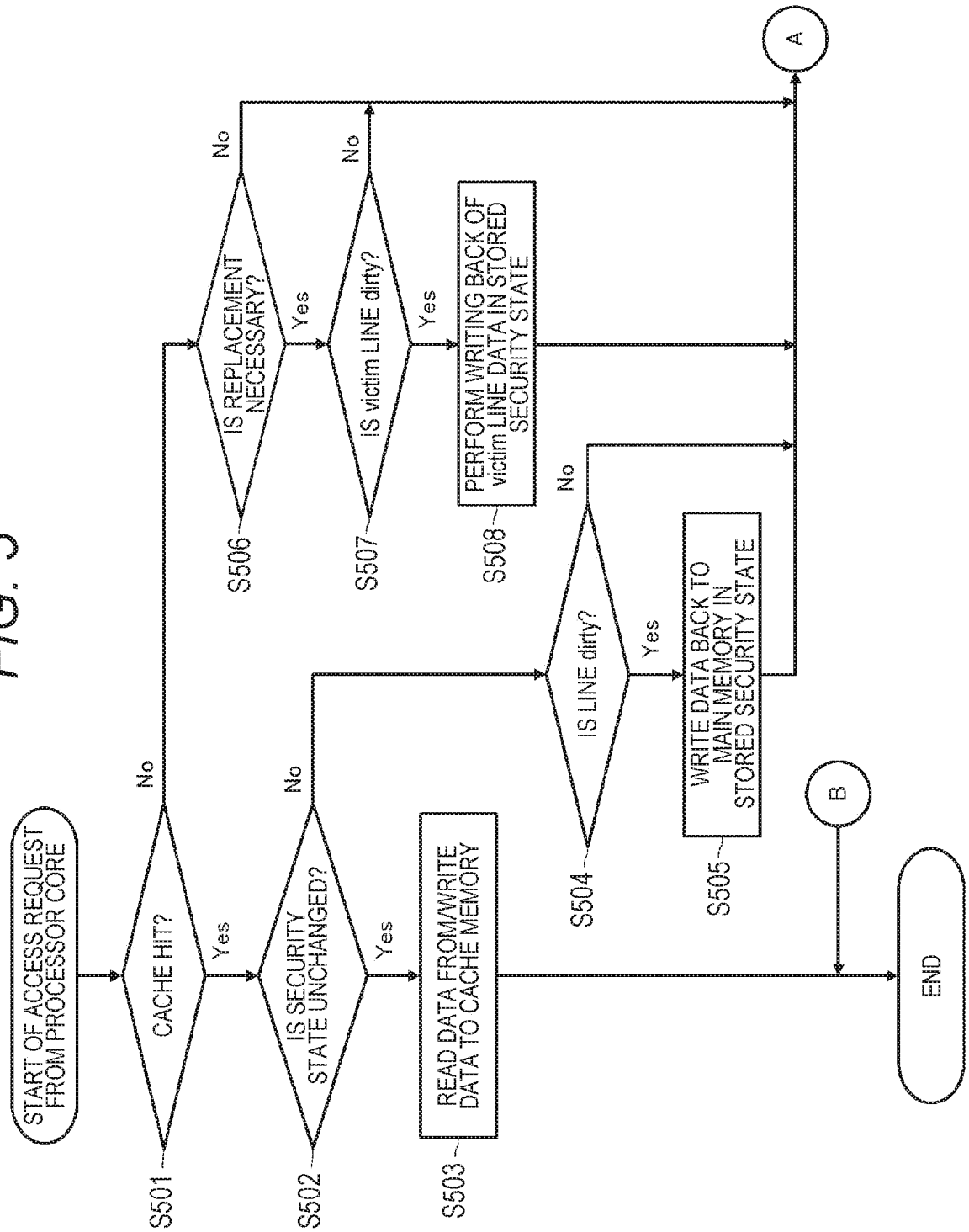
FIG. 5 is a flowchart (first half) showing a procedure for controlling memory access in the memory management system 1.
Figure 6:
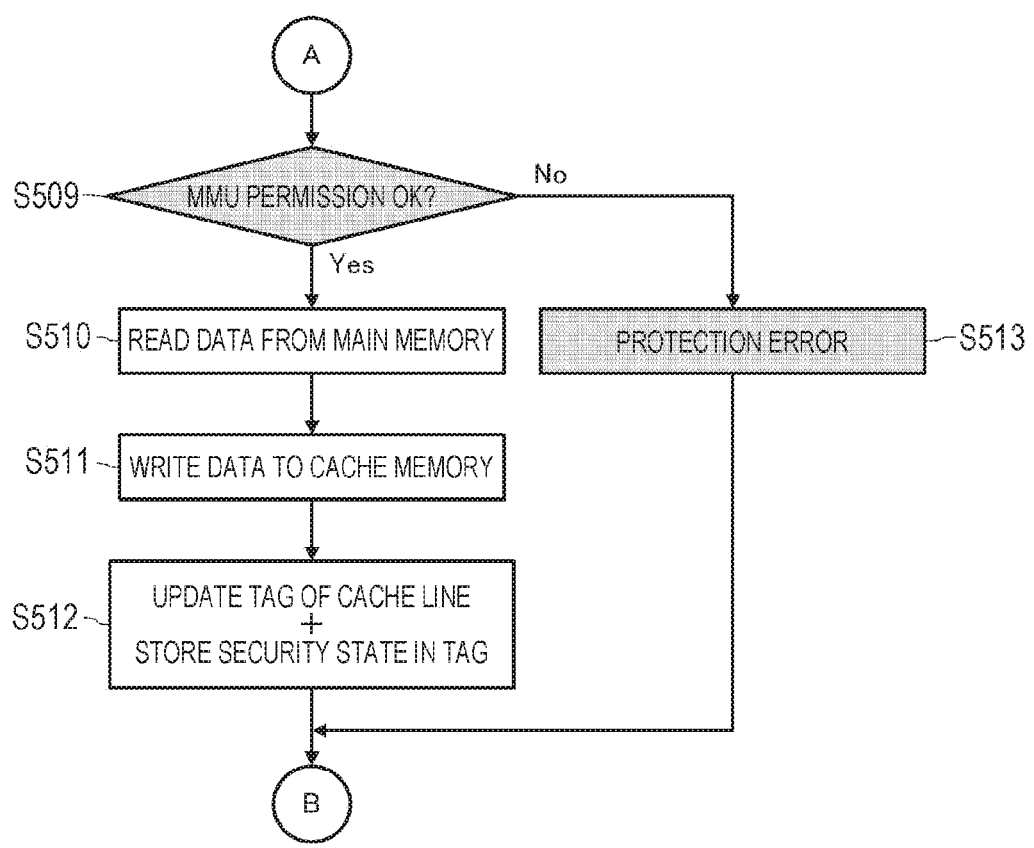
FIG. 6 is a flowchart (second half) showing the procedure for controlling memory access in the memory management system 1.

FIGS. 5 and 6 each show, in the form of a flowchart, a procedure for controlling memory access in the memory management system 1 adopting the virtual address cache method. Note that the cache memory 20 is configured such that security states are stored in cache line units in the cache memory 20. Furthermore, in the flowcharts shown in FIGS. 5 and 6, processing steps to be performed by the MMU 30 are shown in gray, and the other processing steps are performed in the cache memory 20.

This procedure is started in response to a memory access request issued by the processor core 10.

First, the cache memory 20 is searched to check whether a cache line corresponding to a virtual address requested by the processor core 10 exists, that is, whether a cache hit occurs (step S501).

In a case where a cache hit occurs (Yes in step S501), it is further checked whether a security state communicated simultaneously with the memory access request is the same as a security state stored in a cache line that hits the request (step S502).

Then, if there is no change in the security state (Yes in step S502), a reading process or a writing process is performed on the cache line according to the memory access request (step S503), and the process ends.

Therefore, as long as the security state of the process by the processor core 10 does not change, data stored in the cache memory 20 can continue to be accessed without a permission check by the MMU 30.

Meanwhile, when there is a change in the security state (No in step S502), the process proceeds as follows. When the line on which the cache hit has occurred is "dirty", that is, when data of the cache line have been updated (Yes in step S504), data are written back to the main memory 40 in a security state stored for the cache line (step S505). In other words, when there is a change in the security state in which memory access is requested by the processor core 10, a cache flush is performed regardless of whether or not the data have been updated.

Furthermore, in a case where a cache miss occurs on the virtual address requested by the processor core 10 (No in step S501), it is subsequently checked whether the cache memory 20 is full and replacement is necessary (step S506). In a case where replacement is necessary (step S506 Yes), data to be discarded, that is, a victim cache line is determined according to a predetermined replacement algorithm. Then, when the victim line is "dirty", that is, when the data have been updated (Yes in step S507), the data of the victim line are written back to the main memory 40 in a security state stored for the victim line (step S508).

Then, when a cache miss occurs on the virtual address requested by the processor core 10 (No in step S501), or in a case where the security state of the process by the processor core 10 has changed (No in step S502), the MMU 30 converts the virtual address into a physical address and in addition, checks whether to permit the memory access request from the processor core 10 with reference to permission information on a corresponding entry in the TLB 31 (step S509).

The technology disclosed in the present specification is similar to the conventional technology in the mechanism in which the MMU 30 refers to the TLB 31 to perform address conversion and the mechanism in which the page walk mechanism 32 searches the page table 41 in the main memory 40 to find information on a physical address of a page corresponding to a requested virtual address and creates a new TLB entry when a TLB miss occurs. Thus, a detailed description is omitted here.

Furthermore, in processing step S509, the MMU 30 can determine whether to permit memory access or protect the memory with reference to a flag corresponding to the security state communicated from the processor core 10 simultaneously with the memory access request, among 8-bit permission information stored in a TLB entry corresponding to the requested virtual address (described above).

Here, in a case where the MMU 30 permits the memory access request from the processor core 10 (Yes in step S509), the MMU 30 reads data from a corresponding physical address in the main memory 40 (step S510). Then, the read data are written to a free line or a victim line in the cache memory 20 (step S511). Furthermore, tag information of the cache line is updated, and in addition, the security state of the data written in the cache line is stored in the tag (step S512), and the process ends.

Furthermore, in a case where the MMU 30 does not permit the memory access request from the processor core 10 (No in step S509), the MMU 30 returns a protection error to the processor core 10 as the access request source (step S513), and ends the process.

According to the memory access procedure shown in FIGS. 5 and 6, it is possible to protect data in the cache memory 20 adopting the virtual address cache method by storing a small amount of information, that is, storing a security state in the cache memory 20.

Furthermore, according to the memory access procedure shown in FIGS. 5 and 6, data once stored in the cache memory 20 when a cache miss occurs can continue to be used without a permission check by the MMU 30 as long as the security state of a process to be performed in the processor core 10 does not change. As a result, power efficiency and circuit speed are improved in the memory management system 1. In addition, when there is a change in the security state of the process to be performed in the processor core 10, the cache memory 20 detects the change, and flushes minimum old data. Then, the MMU 30 performs again the process to be performed at the time of a cache miss. At that time, a permission check is also performed.

A method in which a tag area associated with each cache line is expanded can be cited as a method for storing a security state for each cache line in the cache memory 20.

Figure 7:
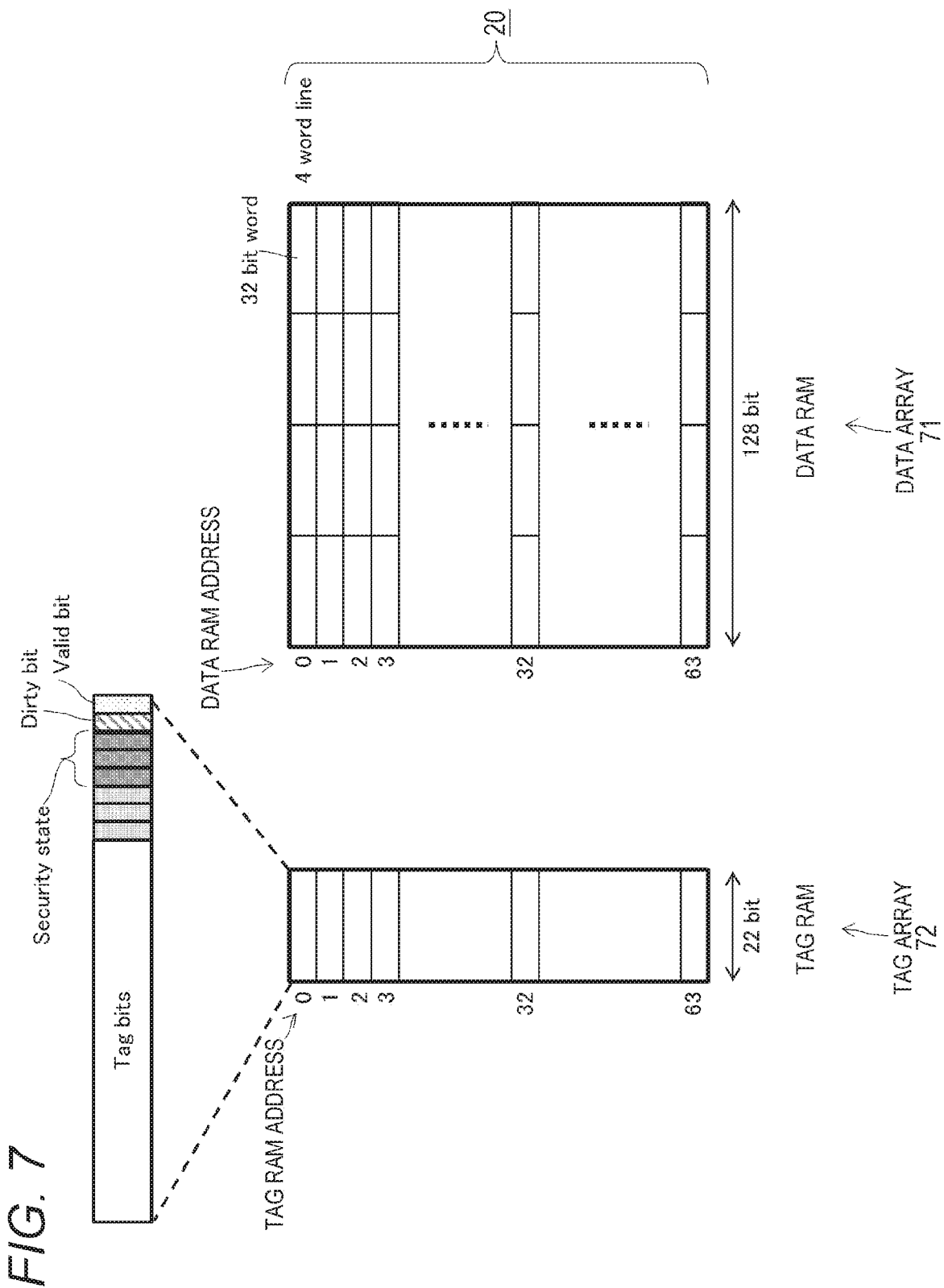
FIG. 7 is a diagram showing an implementation example of the cache memory 20 configured to store a security state for each cache line in a tag bit.

FIG. 7 shows an implementation example of the cache memory 20 configured to store a security state for each cache line in a tag bit. Note that although a cache memory having a one-way configuration is shown for simplification of the drawing, a two-way configuration or another multi-way configuration can be similarly adopted.

The shown cache memory 20 includes a data array 71 and a tag array 72. The data array 71 includes a set of cache lines. The tag array 72 includes tag memories corresponding to the respective cache lines.

In the shown example, the data array 71 includes a data RAM in which 64 lines of 0 to 63 constitute a single bank. Furthermore, four words constitute a single line. A single word corresponds to 32 bits. Accordingly, a single line corresponds to 128 bits.

The tag array 72 includes a tag RAM that includes a total of 64 tag memories 0 to 63 corresponding to the respective lines of the data array 71. A single tag includes a tag bit having a length of 22 bits.

Each line of the data array 71 is assigned a data RAM address. Furthermore. Each tag of the tag array 72 is assigned a tag RAM address. There is a correspondence relationship between the data RAM address and the tag RAM address.

Each tag includes a valid bit and a dirty bit. The valid bit indicates whether a corresponding cache line is valid or invalid. The dirty bit indicates whether or not data on the cache line have been updated. In the present embodiment, the tag further allocates 3 bits for security bits so as to indicate a security state.

It is possible to achieve security of data in the cache memory at necessary granularity by appropriately defining the security bits and the permission information (see, for example, FIG. 4). Moreover, it is possible to achieve an advanced security model even in a processor core having only a simple security function by combining an operating system and software.

Furthermore, as other methods for storing a security state for each cache line in the cache memory 20, there can be cited, for example, a method in which a register or memory is mounted separately from a tag and a method in which a register or a memory that holds the security state for each cache line is mounted outside the cache line (neither of the above is shown).

Note that when storing the security state for each cache line, it is possible to perform bit compression. In the example described above, 3 bits are allocated for the security state. However, in a case where only four types of values are used in actual operation, the values may be compressed to 2 bits and stored. Such compression/decompression processing can be implemented by use of either or both of hardware and software.

In the above-described procedure shown in FIGS. 5 and 6, in a case where the security state of data for which memory access is requested by the processor core 10 does not match a security state stored in the cache memory 20, a corresponding cache line is flushed.

In contrast, it is also possible to apply a modified example in which the corresponding cache line is not immediately flushed and the MMU 30 is requested to only perform a protection check even in a case where the security state of the memory access request from the processor core 10 does not match the security state stored in the cache memory 20. According to this modified example, if access is permitted as a result of the protection check by the MMU 30, the security state stored in the cache memory 20 just needs to be updated and a cache flush can be omitted.

Figure 8:
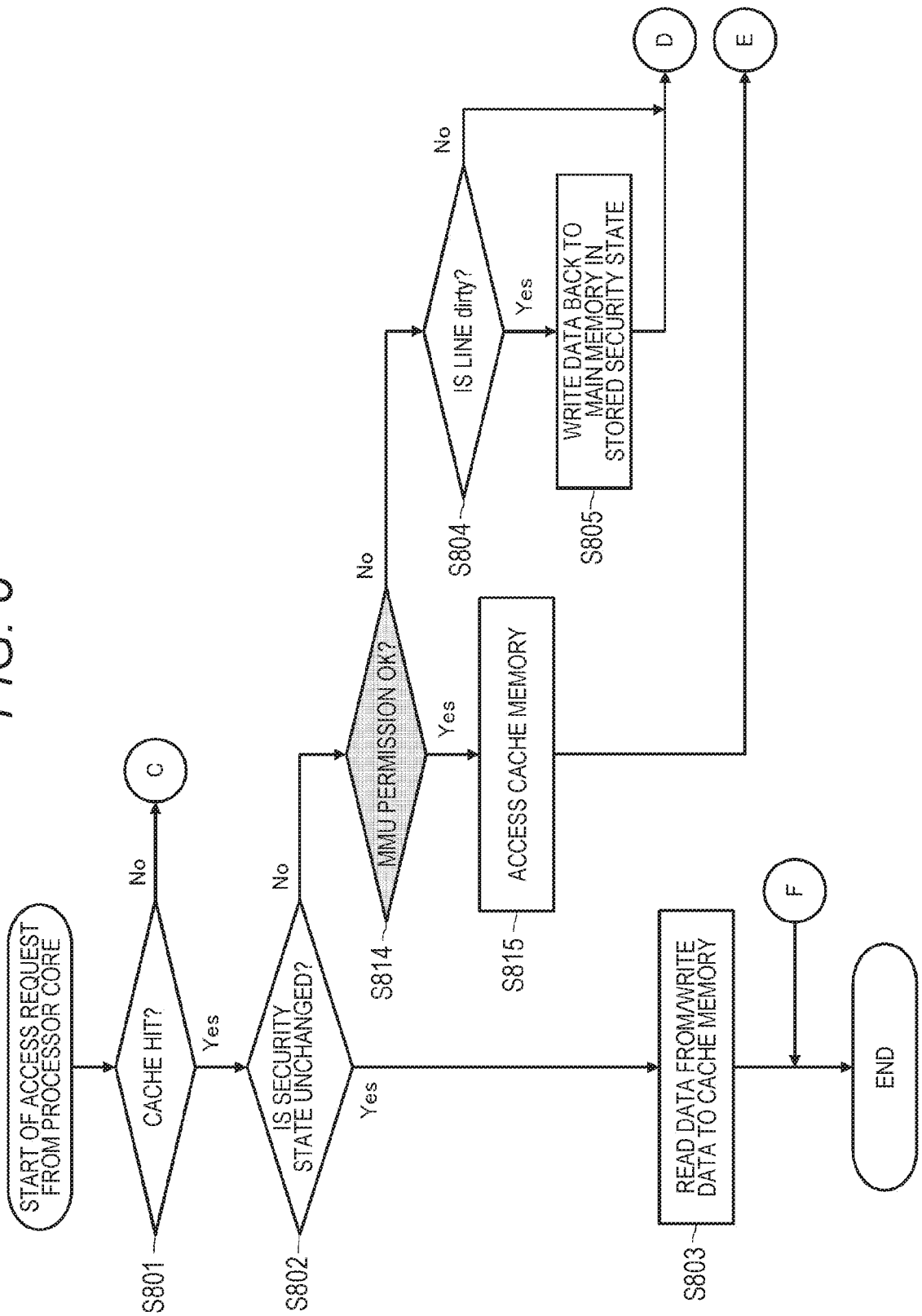
FIG. 8 is a flowchart (first half) showing the deformability of the procedure for controlling memory access in the memory management system 1.
Figure 9:
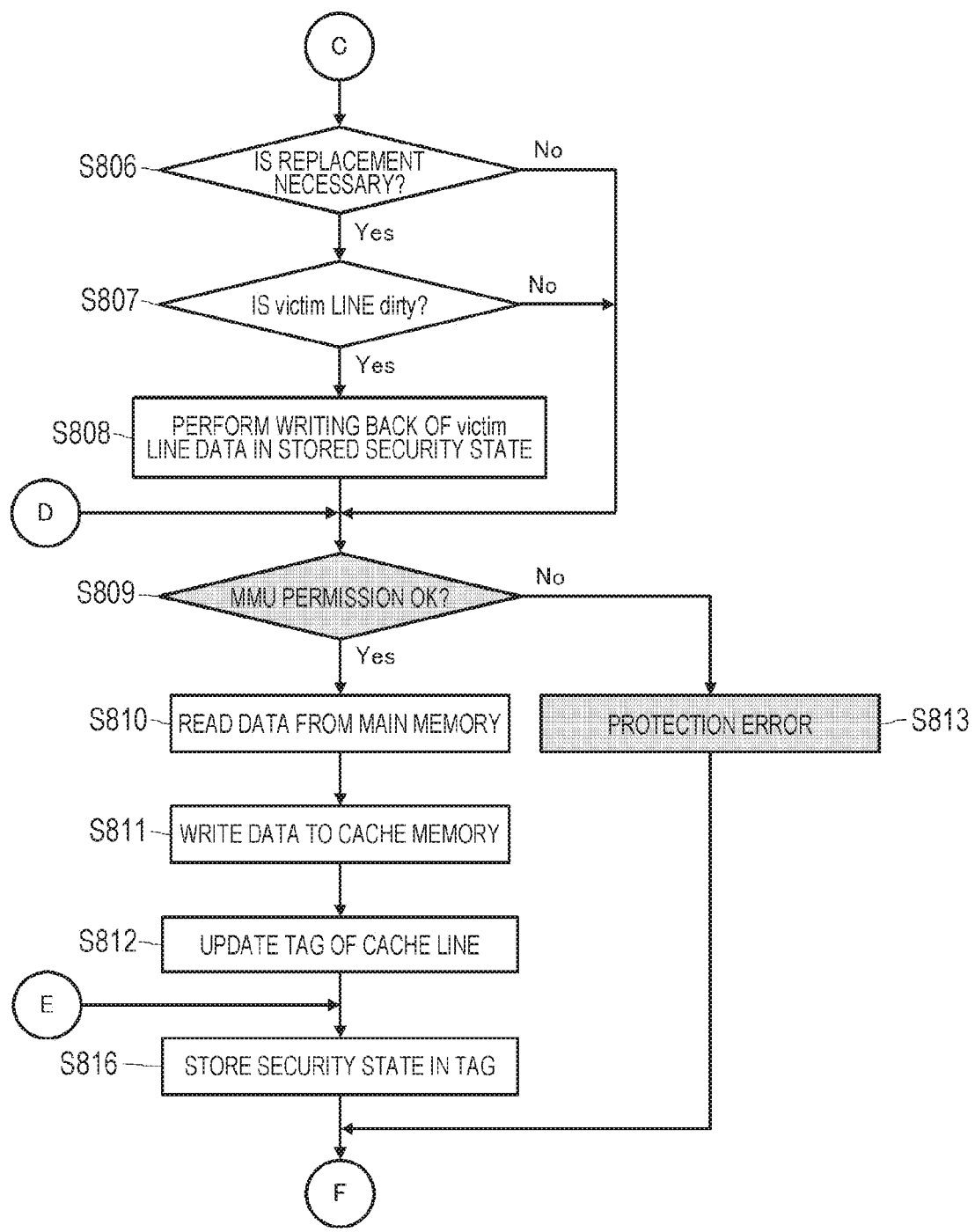
FIG. 9 is a flowchart (second half) showing the modified example of the procedure for controlling memory access in the memory management system 1.

FIGS. 8 and 9 each show, in the form of a flowchart, a modified example of the procedure for controlling memory access in the memory management system 1. In the shown procedure, even in a case where security states do not match, the security state stored in the cache memory 20 just needs to be updated and a cache flush can be omitted if access is permitted as a result of the protection check by the MMU 30.

Note that the cache memory 20 is configured such that security states are stored in cache line units in the cache memory 20. Furthermore, in the flowcharts shown in FIGS. 8 and 9, processing steps to be performed by the MMU 30 are shown in gray, and the other processing steps are performed in the cache memory 20.

This procedure is started in response to a memory access request issued by the processor core 10.

First, the cache memory 20 is searched to check whether a cache line corresponding to a virtual address requested by the processor core 10 exists, that is, whether a cache hit occurs (step S801). Then, in a case where a cache hit occurs (Yes in step S801), it is further checked whether a security state communicated simultaneously with the memory access request is the same as a security state stored in the cache line that hits the request (step S802). Then, if there is no change in the security state (Yes in step S802), a reading process or a writing process is performed on the cache line according to the memory access request (step S803), and the process ends.

Meanwhile, when there is a change in the security state (No in step S802), the MMU 30 converts the virtual address into a physical address and in addition, checks whether to permit the memory access request from the processor core 10 with reference to permission information on a corresponding entry in the TLB 31 (step S814).

In a case where the MMU 30 permits the memory access request from the processor core 10 (Yes in step S814), a reading process or a writing process is performed on the cache line (step S815). After that, the security state of data written to the cache line is stored in the tag (step S816), and the process ends. In other words, when there is a change in the security state in which memory access is requested by the processor core 10, a security state stored in the tag is simply updated and a cache flush is omitted if access is permitted as a result of the protection check by the MMU 30.

Furthermore, in a case where the MMU 30 does not permit the memory access request from the processor core 10 (No in step S814), the process proceeds as follows. When the cache line on which the cache hit has occurred is "dirty", that is, when data of the cache line have been updated (Yes in step S804), the data are written back to the main memory 40 in a security state stored for the cache line (step S805).

Furthermore, in a case where a cache miss occurs on the virtual address requested by the processor core 10 (No in step S801), it is subsequently checked whether the cache memory 20 is full and replacement is necessary (step S806). In a case where replacement is necessary (step S806 Yes), data to be discarded, that is, a victim cache line is determined according to a predetermined replacement algorithm. Then, when the victim line is "dirty", that is, when the data have been updated (Yes in step S807), the data of the victim line are written back to the main memory 40 in a security state stored for the victim line (step S808).

Then, when a cache miss occurs on the virtual address requested by the processor core 10 (No in step S801), or in a case where the security state of the process by the processor core 10 has changed (No in step S802), the MMU 30 converts the virtual address into a physical address and in addition, checks whether to permit the memory access request from the processor core 10 with reference to permission information on a corresponding entry in the TLB 31 (step S809).

In processing step S809, the MMU 30 can determine whether to permit memory access or protect the memory with reference to a flag corresponding to the security state communicated from the processor core 10 simultaneously with the memory access request, among 8-bit permission information stored in a TLB entry corresponding to the requested virtual address (described above).

Here, in a case where the MMU 30 permits the memory access request from the processor core 10 (Yes in step S809), the MMU 30 reads data from a corresponding physical address in the main memory 40 (step S810). Then, the read data are written to a free line or a victim line in the cache memory 20 (step S811). Furthermore, tag information of the cache line is updated step S812), and in addition, the security state of the data written to the cache line is stored in the tag (step S816), and the process ends.

Furthermore, in a case where the MMU 30 does not permit the memory access request from the processor core 10 (No in step S809), the MMU 30 returns a protection error to the processor core 10 as the access request source (step S813), and ends the process.

According to the procedure shown in FIGS. 8 and 9, even in a case where the security state of the memory access request from the processor core 10 does not match the security state stored in the cache memory 20, the security state stored in the cache memory 20 just needs to be updated and it is possible to omit the writing back of data to the main memory 40 if access is permitted as a result of the protection check by the MMU 30.

Furthermore, in a case where a predetermined rule regarding permission exists, it is also possible to apply a modified example in which determination as to permission is made in the cache memory 20 according to the predetermined rule in a case where the security state of the memory access request from the processor core 10 does not match the security state stored in the cache memory 20. According to this modified example, a corresponding cache line is not immediately flushed, and in addition, it is not necessary to request the MMU 30 to only perform a protection check.

Furthermore, in a case where a predetermined rule regarding permission exists, it is also possible to perform memory access control in which determination as to permission is made in the cache memory 20 according to the predetermined rule. Even in a case where the security state of the memory access request from the processor core 10 does not match the security state stored in the cache memory 20, determination as to permission is made in the cache memory 20 according to the predetermined rule. Thus, the MMU 30 need not perform a protection check. Of course, a corresponding cache line is not flushed immediately.

For example, assume that there is a predetermined rule in the cache memory 20 as follows: if a writing process in a security state is already permitted in a permission check performed by the MMU 30, a security state for which the process "write" has been replaced with the process "read" is also permitted.

Specifically, assume that there is a predetermined rule that if the security state (developer, user, write) is already permitted by the MMU 30, the security state (developer, user, read) is also permitted. In such a case, while the security state (developer, user, write) is communicated from the processor core 10 simultaneously with a memory access request, the security state (developer, user, read) is stored in a cache line that hits the memory access request. Thus, the security states do not match. However, the cache line that hits the memory access request is accessed, and a security state stored in the tag is simply updated without a permission check by the MMU 30 or a cache flush. The MMU 30 need not perform a protection check, and a corresponding cache line is not flushed immediately.

Alternatively, the predetermined rule may be a rule that a memory access request issued in a security state with higher authority is permitted. For another example, "proprietary" is a security state higher in authority than "developer", and "privileged" is a security state higher in authority than "user". Thus, even in a case where a security state communicated from the processor core 10 simultaneously with a memory access request does not match a security state stored in the cache memory 20, a cache line that hits the memory access request is accessed, and a security state stored in the tag is simply updated if the security state is higher in authority. The MMU 30 need not perform a protection check. Of course, a corresponding cache line is not flushed immediately.

Note that the function of controlling access to the cache memory 20 on the basis of such a predetermined rule can be implemented by hardware or software, or by a combination of hardware and software.

Figure 10:
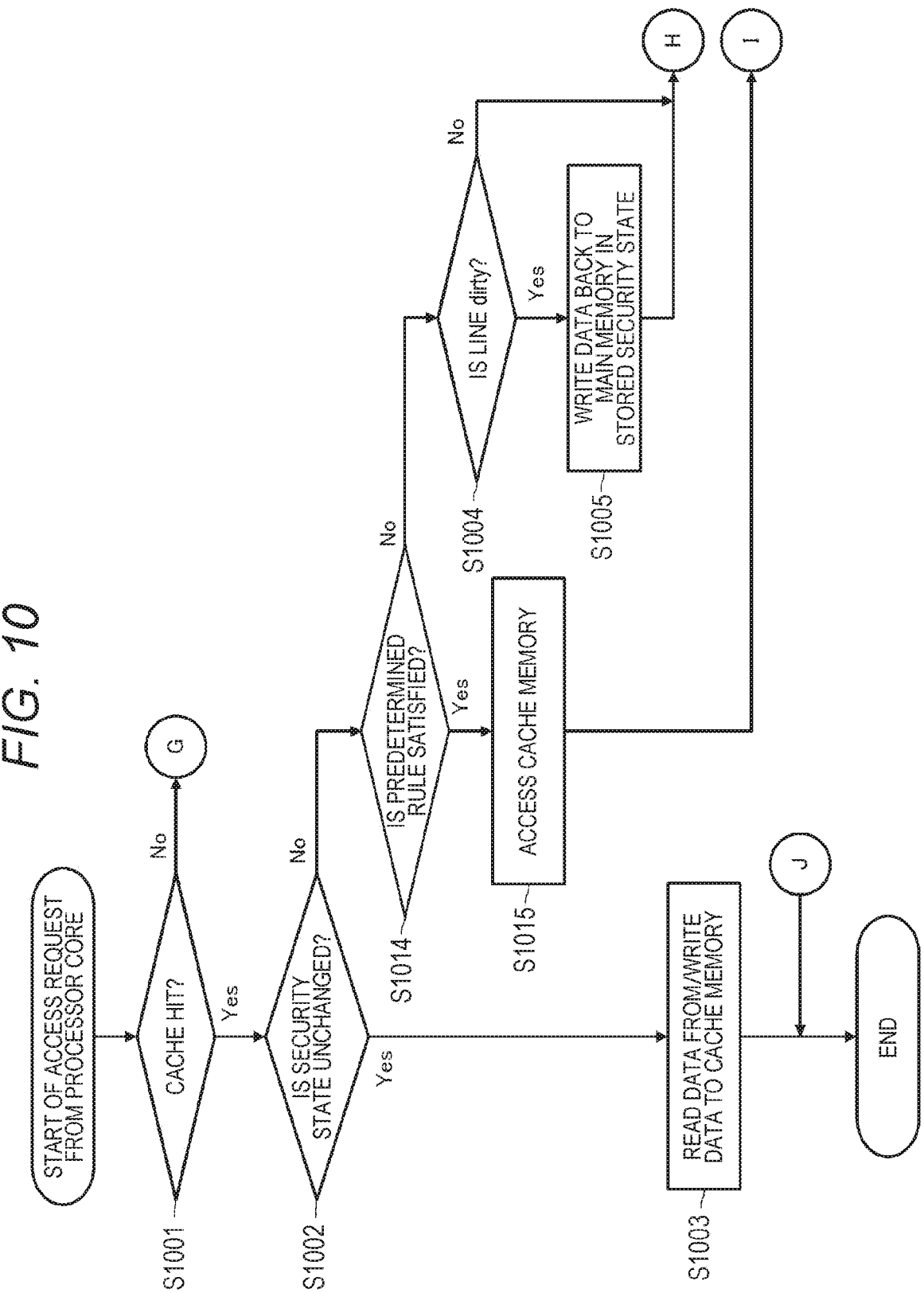
FIG. 10 is a flowchart (first half) showing another modified example of the procedure for controlling memory access in the memory management system 1.
Figure 11:
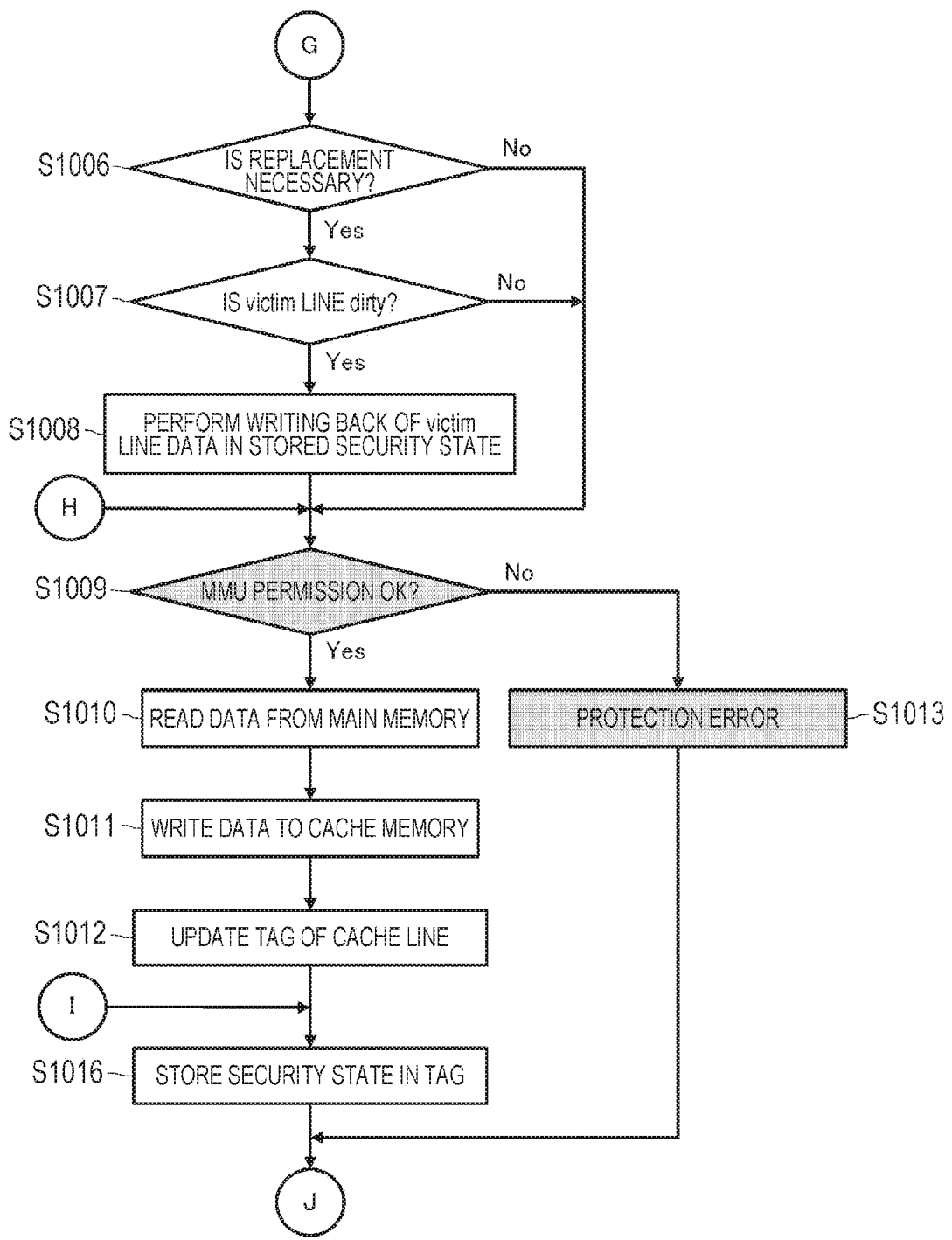
FIG. 11 is a flowchart (second half) showing the another modified example of the procedure for controlling memory access in the memory management system 1.

FIGS. 10 and 11 each show, in the form of a flowchart, a modified example of the procedure for controlling memory access in the memory management system 1. In the shown procedure, in a case where security states do not match, access to the cache memory 20 is controlled according to a predetermined rule existing in the cache memory 20 in the changed security state. In a case where access to the cache memory 20 is permitted, a security state stored in the cache memory 20 just needs to be updated and a cache flush can be omitted.

Note that the cache memory 20 is configured such that security states are stored in cache line units in the cache memory 20. Furthermore, in the flowcharts shown in FIGS. 10 and 11, processing steps to be performed by the MMU 30 are shown in gray, and the other processing steps are performed in the cache memory 20.

This procedure is started in response to a memory access request issued by the processor core 10.

First, the cache memory 20 is searched to check whether a cache line corresponding to a virtual address requested by the processor core 10 exists, that is, whether a cache hit occurs (step S1001). In a case where a cache hit occurs (Yes in step S1001), it is further checked whether a security state communicated simultaneously with the memory access request is the same as a security state stored in a cache line that hits the request (step S1002). Then, if there is no change in the security state (Yes in step S1002), a reading process or a writing process is performed on the cache line according to the memory access request (step S1003), and the process ends.

Meanwhile, when there is a change in the security state (No in step S1002), it is checked whether the changed security state satisfies the predetermined rule existing in the cache memory 20 (step S1014). For example, it is checked whether the security state in which memory access is requested by the processor core 10 is higher in authority than the security state stored in the cache line that hits the request in the cache memory 20.

In a case where the change in the security state satisfies the predetermined rule (Yes in step S1014), a reading process or a writing process is performed on the cache line (step S1015). After that, the security state of the data written to the cache line is stored in the tag (step S1016), and the process ends. In other words, when there is a change in the security state in which memory access is requested by the processor core 10, a security state stored in the tag is simply updated and a cache flush is omitted if it is determined that access is permitted according to the predetermined rule existing in the cache memory 20.

Furthermore, in a case where the MMU 30 does not permit the memory access request from the processor core 10 (No in step S1014), the process proceeds as follows. When the cache line on which the cache hit has occurred is "dirty", that is, when data of the cache line have been updated (Yes in step S1004), the data are written back to the main memory 40 in the security state stored for the cache line (step S1005).

Furthermore, in a case where a cache miss occurs on the virtual address requested by the processor core 10 (No in step S1001), it is subsequently checked whether the cache memory 20 is full and replacement is necessary (step S1006). In a case where replacement is necessary (step S1006 Yes), data to be discarded, that is, a victim cache line is determined according to a predetermined replacement algorithm. Then, when the victim line is "dirty", that is, when the data have been updated (Yes in step S1007), the data of the victim line are written back to the main memory 40 in a security state stored for the victim line (step S1008).

Then, when a cache miss occurs on the virtual address requested by the processor core 10 (No in step S1001), or in a case where the security state of the process by the processor core 10 has changed (No in step S1002), the MMU 30 converts the virtual address into a physical address and in addition, checks whether to permit the memory access request from the processor core 10 with reference to permission information on a corresponding entry in the TLB 31 (step S1009).

In processing step S1009, the MMU 30 can determine whether to permit memory access or protect the memory with reference to a flag corresponding to the security state communicated from the processor core 10 simultaneously with the memory access request, among 8-bit permission information stored in a TLB entry corresponding to the requested virtual address (described above).

Here, in a case where the MMU 30 permits the memory access request from the processor core 10 (Yes in step S1009), the MMU 30 reads data from a corresponding physical address in the main memory 40 (step S1010). Then, the read data are written to a free line or a victim line in the cache memory 20 (step S1011). Furthermore, tag information of the cache line is updated step S1012), and in addition, the security state of the data written to the cache line is stored in the tag (step S1016), and the process ends.

Furthermore, in a case where the MMU 30 does not permit the memory access request from the processor core 10 (No in step S1009), the MMU 30 returns a protection error to the processor core 10 as the access request source (step S1013), and ends the process.

According to the procedure shown in FIGS. 10 and 11, even in a case where the security state of the memory access request from the processor core 10 does not match the security state stored in the cache memory 20, the security state stored in the cache memory 20 just needs to be updated and it is possible to omit the writing back of data to the main memory 40 if the changed security state is permitted according to the predetermined rule existing in the cache memory 20.

Note that in addition to the above-described procedures (FIGS. 5 and 6, FIGS. 8 and 9, and FIGS. 10 and 11), it is also possible to configure the memory management system 1 such that when the security state of the processor core 10 changes, the change is automatically detected in the cache memory 20 adopting the virtual address method and a cache flush is omitted by software.

The memory management system 1 according to the present embodiment enables a reduction in the amount of information to be stored in the cache memory 20 so as to protect data in the cache memory 20. Therefore, expensive memory resources (flip-flops or SRAMs) to be used for the tag memory can be reduced.

The technology disclosed in the present specification can be easily implemented simply by a change of the design of a cache line. Thus, there is no need to add a sideband signal (for copying permission information) to a bus connecting the cache memory 20 and the MMU 30 or to change the design of the MMU30.

Therefore, the technology disclosed in the present specification has the effect of reducing memory resources and control circuits for protecting data in a cache memory adopting the virtual address cache method and improving power efficiency. Accordingly, the technology disclosed in the present specification can be suitably applied to the ultra-low power consumption IoT and wearable devices.

INDUSTRIAL APPLICABILITY

The technology disclosed in the present specification has been described above in detail with reference to the specific embodiment. However, it is obvious that those skilled in the art can make modifications and substitutions of the embodiment without departing from the gist of the technology disclosed in the present specification.

The memory management technology disclosed in the present specification can be applied to, for example, an embedded device merely including a small-capacity memory, so that data in a cache memory adopting the virtual address cache method can be protected with a small amount of information stored in the cache memory. Of course, the memory management technology disclosed in the present specification can be applied to various types of information processing apparatuses equipped with a normal or large-capacity memory and adopting the virtual address cache method.

In short, the technology disclosed in the present specification has been described by way of example, and the contents described in the present specification should not be interpreted restrictively. In order to determine the gist of the technology disclosed in the present specification, the claims should be considered.

Note that the technology disclosed in the present specification can also adopt the following configurations.

(1) A memory management system including:
a cache memory that temporarily stores data for which memory access is requested by a processor core;
a state storage unit that stores a security state communicated simultaneously with the memory access request from the processor core; and a memory management unit that manages access to a main memory.

(2) The memory management system according to (1) above, in which
the state storage unit stores security states in units of cache lines of the cache memory.

(3) The memory management system according to (1) or (2) above, in which
the state storage unit includes any of a tag memory in the cache memory, a register disposed separately from the tag memory in the cache memory, or a memory or a register mounted outside a cache line body, and stores a security state for each line of the cache memory.

(4) The memory management system according to any one of (1) to (3) above, in which
the memory management unit stores permission information indicating whether or not access is permitted for each security state in each entry of a page table in a translation lookaside buffer, and
the memory management unit determines whether or not access is permitted for the security state communicated simultaneously with the memory access request from the processor core, on the basis of permission information stored in an entry that hits the request.

(5) The memory management system according to any one of (1) to (4) above, in which
in response to the memory access request from the processor core, the state storage unit writes, to the cache memory, data read from the main memory after a protection check by the memory management unit, and stores the security state in association with a corresponding cache line.

(6) The memory management system according to any one of (1) to (5) above, in which
in a case where the security state in which memory access is requested by the processor core does not match a security state stored in the state storage unit, a cache flush is performed for a cache line that hits the request.

(7) The memory management system according to any one of (1) to (5) above, in which in a case where the security state in which memory access is requested by the processor core does not match a security state stored in the state storage unit, a protection check is performed by the memory management unit, and in a case where the memory access request is permitted, a cache line that hits the request is accessed and the security state stored in the state storage unit is updated.

(8) The memory management system according to any one of (1) to (5) above, in which
in a case where although the security state in which memory access is requested by the processor core does not match a security state stored in the state storage unit, a difference between the security states satisfies a predetermined rule within the cache memory, a cache line that hits the request is accessed and the security state stored in the state storage unit is updated.

(9) The memory management system according to any one of (1) to (5) above, in which
in a case where the security state in which memory access is requested by the processor core is higher in authority than a security state stored in the state storage unit, a cache line that hits the request is accessed and the security state stored in the state storage unit is updated.

(10) The memory management system according to any one of (1) to (9) above, in which
the cache memory adopts a virtual address cache method.

(11) A memory management method including:
a step of reading, from a main memory, data for which memory access is requested by a processor core and temporarily storing the data in a cache memory;
a state storage step of storing a security state communicated simultaneously with the memory access request from the processor core; and
a control step of controlling access to the cache memory and the main memory on the basis of a result of comparing the security state in which memory access is requested by the processor core with a security state stored in the state storage unit.

(11-1) The memory management method according to (11) above, in which
in a case where the security state in which memory access is requested by the processor core does not match the security state stored in the state storage unit, a cache flush is performed for a cache line that hits the request in the control step.

(11-2) The memory management method according to (11) above, in which
in a case where the security state in which memory access is requested by the processor core does not match the security state stored in the state storage unit, a protection check is performed by the memory management unit and in a case where the memory access request is permitted, a cache line that hits the request is accessed and the security state stored in the state storage unit is updated in the control step.

(11-3) The memory management method according to (11) above, in which
in a case where although the security state in which memory access is requested by the processor core does not match the security state stored in the state storage unit, a difference between the security states satisfies a predetermined rule within the cache memory, a cache line that hits the request is accessed and the security state stored in the state storage unit is updated.

(12) An information processing apparatus including:
a processor core;
a main memory;

a cache memory that temporarily stores data for which memory access is requested by the processor core;

a state storage unit that stores a security state communicated simultaneously with the memory access request from the processor core; and a memory management unit that manages access to the main memory.

REFERENCE SIGNS LIST

1 Memory management system
10 Processor core
20 Cache memory
30 MMU
31 TLB
32 Page walk mechanism
40 Main memory
41 Page table
100 Sensing device
101 CPU
102 MMU
103 SRAM
104 Flash memory
105 Sensor
106 Communication module
107 Battery
110 Bus
200 Base station
201 Cloud
202 Serve

The invention claimed is:

1. A memory management system, comprising:
a cache memory configured to temporarily store data for which a memory access request is received from a processor core, wherein the memory access request is received concurrently with a security state of a process for which the memory access request is received from the processor core;
a state storage unit configured to store a security state of each cache line of the cache memory; and
circuitry configured to:
determine a difference between the security state of the process and the stored security state satisfies a determined rule in the cache memory in a case where the security state of the process does not match the stored security state; and
permit access of a cache line that hits the memory access request based on the determination that the difference satisfies the determined rule.

2. The memory management system according to claim 1, wherein
the state storage unit is further configured to store a plurality of security states in units of cache lines of the cache memory, and
the plurality of security states includes the stored security state of the cache line.

3. The memory management system according to claim 1, wherein
the state storage unit comprises one of a tag memory in the cache memory, a register disposed separately from the tag memory in the cache memory, a memory outside a cache line body, or a register outside the cache line body, and
the state storage unit is further configured to store the security state for each cache line of the cache memory.

4. The memory management system according to claim 1, further comprising a memory management unit configured to manage access to a main memory, wherein the memory management unit is further configured to:
store permission information that indicates whether access is permitted for each security state in each entry of a page table in a translation lookaside buffer; and
determine whether access is permitted for the security state of the process based on the permission information stored in an entry that hits the memory access request.

5. The memory management system according to claim 1, further comprising a memory management unit configured to manage access to a main memory, wherein
the memory management unit is further configured to perform a protection check; and
the state storage unit is further configured to:
write, based on the memory access request from the processor core, data read from the main memory to the cache memory based on the protection check by the memory management unit; and
store the security state in association with a corresponding cache line of the cache memory.

6. The memory management system according to claim 1, wherein
in a case where the security state of the process for which the memory access request is received does not match the stored security state, the circuitry is further configured to perform a cache flush for the cache line that hits the memory access request, based on the determination that the difference does not satisfy the determined rule.

7. The memory management system according to claim 1, further comprising a memory management unit configured to manage access to a main memory, wherein
in a case where the security state of the process for which the memory access request is received does not match the stored security state,
the memory management unit is further configured to perform a protection check, and
in a case where the memory access request is permitted, the circuitry is further configured to:
control access of the cache line that hits the memory access request; and
control update of the security state stored in the state storage unit.

8. The memory management system according to claim 1, wherein the circuitry is further configured to
update the security state stored in the state storage unit based on the determination that the difference satisfies the determined rule.

9. The memory management system according to claim 1, wherein
in a case where the security state of the process for which the memory access request is received is higher in authority than the stored security state, the circuitry is further configured to permit the access of the cache line that hits the memory access request.

10. The memory management system according to claim 1, wherein the cache memory is configured to adopt a virtual address cache method.

11. A memory management method, comprising:
reading, from a main memory, data for which a memory access request is received from a processor core;
storing the data temporarily in a cache memory, wherein the memory access request is received concurrently with a security state of a process for which the memory access request is received from the processor core;
storing, by a state storage unit, a security state of each cache line of the cache memory;

determining, by circuitry, a difference between the security state of the process and the stored security state satisfies a determined rule in the cache memory in a case where the security state of the process does not match the stored security state; and permitting, by the circuitry, access of a cache line that hits the memory access request based on the determination that the difference satisfies the determined rule.

12. An information processing apparatus, comprising:

a processor core;

a main memory;

a cache memory configured to temporarily store data for which a memory access request is received from the processor core, wherein the memory access request is received concurrently with a security state of a process for which the memory access request is received from the processor core;

a state storage unit configured to store a security state of each cache line of the cache memory;

circuitry configured to:
  determine a difference between the security state of the process and the stored security state satisfies a determined rule in the cache memory in a case where the security state of the process does not match the stored security state; and
  permit access of a cache line that hits the memory access request based on the determination that the difference satisfies the determined rule; and a memory management unit configured to manage access to the main memory.

* * * * *